United States Patent
Chou et al.

(10) Patent No.: US 9,834,866 B2
(45) Date of Patent: Dec. 5, 2017

(54) MANUFACTURING METHOD FOR TRANSPARENT FIBER

(71) Applicant: Taiwan Textile Research Institute, New Taipei (TW)

(72) Inventors: Shang-Chih Chou, New Taipei (TW); Chun-Hung Chen, New Taipei (TW); Chun-Hung Lin, New Taipei (TW)

(73) Assignee: Taiwan Textile Research Institute, New Taipei (TW)

( * ) Notice: Subject to any disclaimer, the term of this patent is extended or adjusted under 35 U.S.C. 154(b) by 251 days.

(21) Appl. No.: 14/738,958

(22) Filed: Jun. 15, 2015

(65) Prior Publication Data

US 2016/0145774 A1    May 26, 2016

(30) Foreign Application Priority Data

Nov. 26, 2014    (TW) .............................. 103140972 A

(51) Int. Cl.

| | |
|---|---|
| *C08G 73/10* | (2006.01) |
| *D01D 5/06* | (2006.01) |
| *D02J 1/22* | (2006.01) |
| *D01F 6/74* | (2006.01) |
| *D01D 5/12* | (2006.01) |

(Continued)

(52) U.S. Cl.
CPC ........... *D01F 6/74* (2013.01); *C08G 73/1003* (2013.01); *D01D 5/12* (2013.01); *D01D 5/16* (2013.01); *D01D 10/02* (2013.01); *D02J 1/228* (2013.01)

(58) Field of Classification Search
CPC ...... C08G 73/10; C08G 73/1003; D01D 5/06; D01D 5/12; D01D 5/16; D01D 10/02; D01F 6/74; D02J 1/22; D02J 1/228; D10B 2331/14
USPC ... 264/178 F, 178 R, 183, 184, 210.7, 210.8; 528/289
See application file for complete search history.

(56) References Cited

U.S. PATENT DOCUMENTS 3,985,934 A * 10/1976 Farrissey, Jr. ............. D01F 6/78
264/184 X
4,994,544 A *  2/1991 Nagahiro .................. D01F 6/74
264/176.1

(Continued)

FOREIGN PATENT DOCUMENTS

| CN | 1232686 | 12/2005 |
|---|---|---|
| CN | 101454490 | 6/2009 |

(Continued)

*Primary Examiner* — Leo B Tentoni
(74) *Attorney, Agent, or Firm* — JCIPRNET

(57) ABSTRACT

A manufacturing method for a transparent fiber is provided. The method includes forming a spinning solution containing a polyimide polymer in an organic solvent. The polydispersity index (PDI) of the polyimide polymer is 1.3~2.6. The spinning solution is used to perform a dry-jet wet spinning step to form a plurality of fibers. Furthermore, the plurality of fibers are subjected to a thermal drawing step to form a plurality of transparent fibers, wherein the temperature of the thermal drawing step is controlled from 215° C. to 350° C. The manufacturing method for a transparent fiber provided in the present invention makes use of a polyimide polymer material and utilizes a dry-jet wet spinning step and a thermal drawing step, which allows the formation of a transparent and high strength polyimide fiber.

10 Claims, 1 Drawing Sheet

(51) Int. Cl.
*D01D 5/16* (2006.01)
*D01D 10/02* (2006.01)

(56) References Cited

U.S. PATENT DOCUMENTS

| | | | | |
|---|---|---|---|---|
| 5,596,073 | A | * | 1/1997 | Michaud .................... D01F 6/74 525/422 |
| 6,500,904 | B1 | * | 12/2002 | Hayes .................... C08G 73/10 525/419 |
| 2007/0224422 | A1 | | 9/2007 | Fakhreddine et al. |
| 2010/0048853 | A1 | | 2/2010 | Dris et al. |
| 2012/0015184 | A1 | | 1/2012 | Endo et al. |

FOREIGN PATENT DOCUMENTS

| | | |
|---|---|---|
| CN | 101511939 | 8/2009 |
| CN | 102362021 | 2/2012 |
| DE | 2829811 | 1/1980 |

* cited by examiner

MANUFACTURING METHOD FOR TRANSPARENT FIBER

CROSS-REFERENCE TO RELATED APPLICATION

This application claims the priority benefit of Taiwan application serial no. 103140972, filed on Nov. 26, 2014. The entirety of the above-mentioned patent application is hereby incorporated by reference herein and made a part of this specification.

BACKGROUND OF THE INVENTION

1. Field of the Invention

The present invention generally relates to a manufacturing method for a transparent fiber, in particular to a manufacturing method for a transparent polyimide fiber.

2. Description of Related Art

In recent years, the research and development of polyimide fiber has received a high degree of attention, and its use has been widely applied in various industries. For example, polyimide fibers can be used in the generation of bulletproof and fireproof fabrics, or can be used as a composite material enhancer in the field of aviation technology or rocket manufacturing and so forth. With the advancement of fiber spinning technology and improvement in the method of polyimide fiber synthesis, higher requirements in their fiber properties are demanded in the market.

Conventionally, the melt spinning method is used to synthesize polyimide fibers. However, the melt spinning method usually requires high temperature manufacturing process, which results in the formation of polyimide fibers having poor strength and that is subjected to thermal degradation. Therefore, the market needs an improved method for manufacturing polyimide fibers, so as to provide higher quality fibers and to overcome the existing problems.

SUMMARY OF THE INVENTION

Accordingly, the present invention is directed to a manufacturing method for a transparent fiber that can be used to foam polyimide fibers having goodfiber fineness and high strength, while solving the existing problems.

A manufacturing method of a transparent fiber in an embodiment of the invention is provided, and the method includes the following steps. A spinning solution is provided. The spinning solution includes a polyimide polymer in an organic solvent, wherein the polydispersity index (PDI) of the polyimide polymer is from 1.3 to 2.6. The spinning solution is used to perform a dry-jet wet spinning step to form a plurality of fibers. Furthermore, the plurality of fibers is subjected to a thermal drawing step to form a plurality of transparent fibers, wherein the temperature of the thermal drawing step is controlled form 215° C. to 350° C.

In an embodiment of the invention, the polyimide polymer in the spinning solution has a molecular weight range from 32,000 g/mol to 55,000 g/mol.

In an embodiment of the invention, the polyimide polymer in the spinning solution has a weight percentage from 8 wt % to 40 wt %.

In an embodiment of the invention, the thermal drawing step has a thermal drawing ratio from 1 to 5.

In an embodiment of the invention, the manufacturing method further includes a hot roller expansion process before performing the thermal drawing step.

In an embodiment of the invention, the hot roller expansion process has an expansion ratio from 1 to 5.

In an embodiment of the invention, the dry-jet wet spinning process further includes loading the spinning solution into a spinning apparatus. The spinning solution is ejected from the spinning apparatus, comes in contact with air and enters a coagulation bath to form a plurality of transparent fibers.

In an embodiment of the invention, the preparation steps for the spinning solution include mixing a diamine monomer and an dianhydride monomer with an organic solvent. Followed by performing a condensation polymerization reaction to form a polyamic acid polymer, then performing a cyclization reaction of the polyamic acid polymer to form the polyimide polymer.

In an embodiment of the invention, the diamine monomer is selected from one of formula (1) to formula (4):

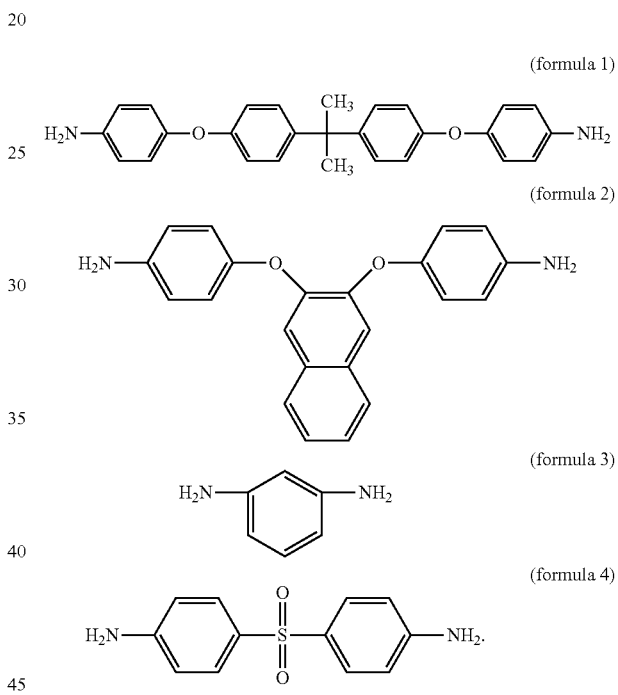

In an embodiment of the invention, the dianhydride monomer is selected from one of formula (5) to formula (7):

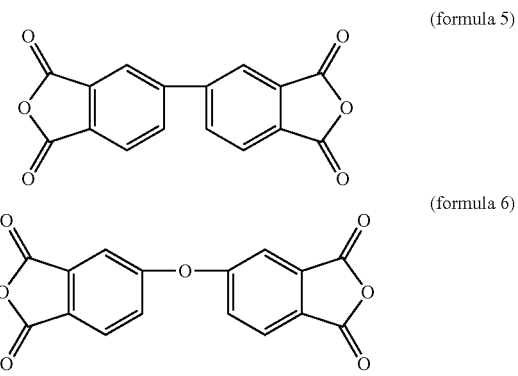

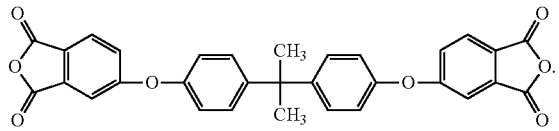

(formula 7)

Based on the above summary, the polyimide polymer having a polydispersity index of 1.3~2.6 is used as the material for manufacturing a transparent fiber, and a dry-jet wet spinning step in combination with a thermal drawing step at a temperature of 215° C.~350° C. is performed. As such, the polyimide fiber synthesized will have good fiber fineness and high fiber strength. Furthermore, the dry-jet wet spinning step performed does not require the use of high toxic solvents, and the thermal drawing step can be controlled in a lower temperature range. Therefore, the existing problems in the conventional manufacturing process can be resolved.

In order to make the features and advantages of the invention more comprehensible, the invention is further described in detail in the following with reference to the embodiments and the accompanying drawings.

DESCRIPTION OF THE EMBODIMENTS

Figure 1:
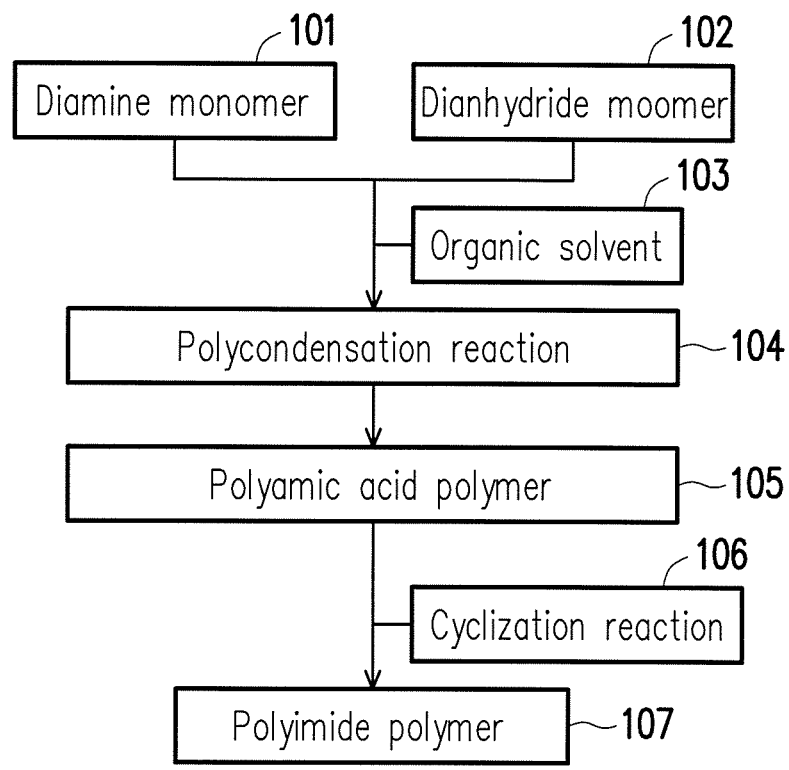
FIG. 1 is a flow chart showing the preparation steps for a spinning solution in an embodiment of the invention.

FIG. 1 is a flow chart showing the preparation steps for a spinning solution in an embodiment of the invention. Referring to FIG. 1, a diamine monomer 101, an dianhydride monomer 102 and an organic solvent 103 is mixed together. In an embodiment of the invention, the diamine monomer 101 is selected from one of formula (1) to formula (4):

(formula 1; BAPP)

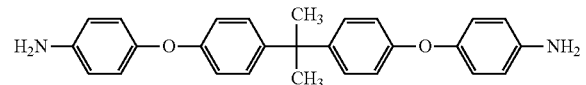

(formula 2; 2,3-NADA)

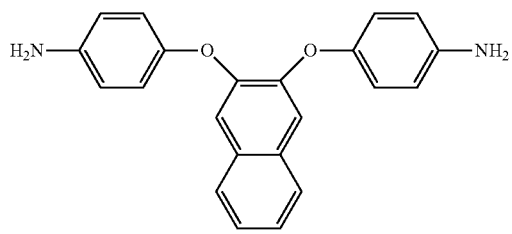

(formula 3; m-PDA)

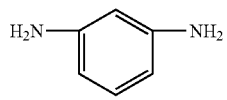

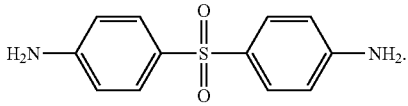

(formula 4; p-DAS)

In an embodiment of the invention, the dianhydride monomer 102 is selected from one of formula (5) to formula (7):

(formula 5; BPDA)

(formula 6; ODPA)

(formula 7; BPADA)

The organic solvent 103 is used to dissolve the diamine monomer 101 and the dianhydride monomer 102. More specifically, the organic solvent 103 can be for example, dimethylacetamide (DMAc) or N-methylpyrrolidone (NMP), but is not limited in the invention. After dissolving the diamine monomer 101 and the dianhydride monomer 102 with the organic solvent 103, a polycondensation reaction 104 is performed to form the polyamic acid polymer 105. In the next step, a cyclization reaction 106 of the polyamic acid polymer 105 is performed to form a spinning solution containing the polyimide polymer 107. The preparation steps for a spinning solution described above will form a polyimide polymer with a polydispersity index (PDI) of 1.3~2.6, with a molecular weight range of 32,000 g/mol~55,000 g/mol.

Figure 2:
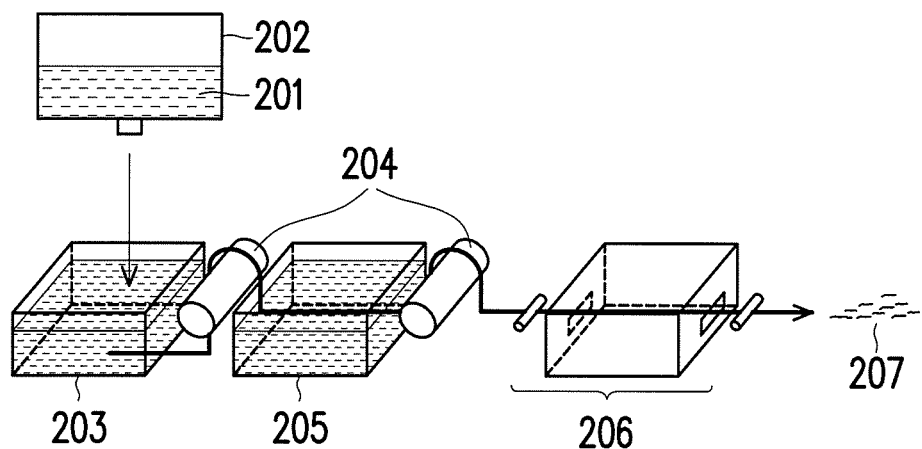
FIG. 2 is a schematic diagram showing the manufacturing method for a transparent fiber in an embodiment of the invention.

FIG. 2 is a schematic diagram showing the manufacturing method for a transparent fiber in an embodiment of the invention. Referring to FIG. 2, after forming the spinning solution 201, a dry-jet wet spinning step is then performed. Firstly, the spinning solution 201 is loaded into a spinning apparatus 202, wherein the spinning solution 201 is ejected from the spinning apparatus 202. In the next step, the spinning solution 201 comes into contact with air and enters a coagulation bath 203 to form a plurality of as-spun fibers. A hot roller expansion process is then performed, wherein the hot rollers 204 is used to extend the plurality of fibers. The extended plurality of fibers is then disposed into a washing tank 205, so as to wash out any remaining organic solvents on the plurality of fibers. Furthermore, another hot roller expansion process can be performed by using the hot rollers 204. The two hot roller expansion process described above will have an expansion ratio ranging from 1 to 5 in total. Although in the present embodiment, the hot roller expansion process is performed twice, however the invention is not limited thereto. For example, in another embodiment of the invention, the hot roller expansion process can be performed once, or even several times so as to achieve an expansion ratio that sums up to the range from 1 to 5. At last, a thermal expansion system 206 is used to conduct a thermal expansion step on the plurality of fibers. In this last step, the plurality of fibers is subjected to thermal treatment, so that a plurality of transparent fibers 207 is formed. The temperature of the thermal drawing step is controlled at 215° C.~350° C., and the thermal drawing ratio is from 1 to 5. Since the present embodiment uses the dry-jet wet spinning step with the temperature of the thermal drawing step controlled at 215° C.~350° C., therefore high strength fibers can be produced when either high PDI or low PDI (that is PDI=1.3~2.6) polyimide polymer is used as the spinning material.

The features and manufacturing method of the transparent fibers shown in the above embodiments will be described in detail by the experimental examples shown below. However, the experimental examples shown below are not used to limit the invention.

EXPERIMENTAL EXAMPLES

The experimental examples and comparative examples shown below are used to prove that the transparent fiber formed by the manufacturing method in an embodiment of the invention, will retain good fiber fineness and have superior fiber strength.

Experimental Example 1

A polyimide polymer (trade name ULTEM 9011, produced by Sabic Innovative Plastic) with molecular weight of 47,000 and polydispersity index of 2.6 is dissolved in dimethylacetamide solvent with a solid content of 30 wt %, and a dry-jet wet spinning step is performed. The spinning solution is degassed and heated to 90° C., and a dispensing needle with an aperture of 150 μm is used as the spinning nozzle, wherein the dry-jet wet spinning step is performed under a pressure of 100 psi. The coagulation bath is water, and the spinning speed is set at 94 rpm. After the dry-jet wet spinning step, continuous single fibers are obtained. According to the spinning speed, the calculated fiber length/formation time ratio is 14.8 m/min. The formed fibers are washed and cleaned using the washing tank, and then a hot roller expansion process is performed, so that transparent polyimide fibers are formed, wherein the expansion ratio is 1.7. A thermal drawing step on the fibers is then performed, wherein the temperature of the thermal drawing step is controlled between 215° C.~350° C., and the thermal drawing ratio is between 2.96~3.29. The fiber fineness and fiber strength for the formed transparent polyimide fibers are presented in Table 1.

Experimental Example 2

A polyimide polymer (BPDA-BAPP (1:1); intrinsic viscosity $\eta_{inh}$=2.37 dL/g) with molecular weight of 530,000 and polydispersity index of 1.34 is dissolved in n-methylpyrrolidone solvent with a solid content of 8 wt %, and a dry-jet wet spinning step is performed. The spinning solution is degassed and heated to 150° C., and a dispensing needle with an aperture of 150 μm is used as the spinning nozzle, wherein the dry-jet wet spinning step is performed under a pressure of 80 psi. The coagulation bath is water, and the spinning speed is set at 39 rpm. After the dry-jet wet spinning step, continuous single fibers are obtained. According to the spinning speed, the calculated fiber length/formation time ratio is 6.28 m/min. The formed fibers are washed and cleaned using the washing tank, and then a hot roller expansion process is performed, so that transparent polyimide fibers are formed, wherein the expansion ratio is 1.4. A thermal drawing step on the fibers is then performed, wherein the temperature of the thermal drawing step is controlled between 215° C.~350° C., and the thermal drawing ratio is between 1~3.09. The fiber fineness and fiber strength for the formed transparent polyimide fibers are presented in Table 1.

Experimental Example 3

A polyimide polymer (BPDA-(BAPP-NADA/9:1); intrinsic viscosity $\eta_{inh}$=2.45 dL/g) with molecular weight of 430,000 and polydispersity index of 1.39 is dissolved in N-methylpyrrolidone solvent with a solid content of 10 wt %, and a dry-jet wet spinning step is performed. The spinning solution is degassed and heated to 90° C., and a dispensing needle with an aperture of 150 μm is used as the spinning nozzle, wherein the dry-jet wet spinning step is performed under a pressure of 110 psi. The coagulation bath is water, and the spinning speed is set at 83.3 rpm. After the wet spinning step, continuous single fibers are obtained. According to the spinning speed, the calculated fiber length/formation time ratio is 13.2 m/min. The formed fibers are washed and cleaned using the washing tank, and then a hot roller expansion process is performed, so that transparent polyimide fibers are formed, wherein the expansion ratio is 1.5. A thermal drawing step on the fibers is then performed, wherein the temperature of the thermal drawing step is controlled between 215° C.~350° C., and the thermal drawing ratio is between 1.34~2.01. The fiber fineness and fiber strength for the formed transparent polyimide fibers are presented in Table 1.

Experimental Example 4

A polyimide polymer (BPDA-BAPP (1.02:1); intrinsic viscosity $\eta_{inh}$=1.45 dL/g) with molecular weight of 300,000 and polydispersity index of 1.38 is dissolved in N-methylpyrrolidone solvent with a solid content of 12.5 wt %, and a dry-jet wet spinning step is performed. The spinning solution is degassed and heated to 90° C., and a dispensing needle with an aperture of 150 μm is used as the spinning nozzle, wherein the dry-jet wet spinning step is performed under a pressure of 110 psi. The coagulation bath is water, and the spinning speed is set at 83.3 rpm. After the dry-jet wet spinning step, continuous single fibers are obtained. According to the spinning speed, the calculated fiber length/formation time ratio is 13.2 m/min. The formed fibers are washed and cleaned using the washing tank, and then a hot roller expansion process is performed, so that transparent polyimide fibers are formed, wherein the expansion ratio is 1.5. A the mal drawing step on the fibers is then performed, wherein the temperature of the thermal drawing step is controlled between 215° C.~350° C., and the thermal drawing ratio is between 1.75~1.85. The fiber fineness and fiber strength for the forming transparent polyimide fibers are presented in Table 1.

Comparative Example 1

A melt spinning method is performed using a polyimide polymer (trade name ULTEM 9011, produced by Sabic Innovative Plastic) with molecular weight of 32,000 and polydispersity index of 2.2 under a processing temperature of 390° C. to produce the polyimide fibers. The fiber fineness and fiber strength for the formed transparent polyimide fibers are presented in Table 1.

Comparative Example 2

The same method as experimental example 1 is used to synthesize the fibers in comparative example 2, except that the final thermal drawing step is not performed.

Comparative Example 3

The same method as experimental example 4 is used to synthesize the fibers in comparative example 3, except that the final thermal drawing step is not performed.

TABLE 1

|  | PDI | Spinning solution concentration | Expansion ratio | Thermal drawing ratio | Fiber fineness (dtex) | Fiber strength (cN/dtex) |
|---|---|---|---|---|---|---|
| Experimental Example 1 | 2.6 | 30 wt % | 1.7 | 2.96 | 1.65 | 10.75 |
|  | 2.6 | 30 wt % | 1.7 | 3.07 | 1.48 | 10.51 |
|  | 2.6 | 30 wt % | 1.7 | 3.29 | 1.2 | 10.36 |
| Experimental Example 2 | 1.34 | 8 wt % | 1.4 | 1 | 28.6 | 2.18 |
|  | 1.34 | 8 wt % | 1.4 | 1.83 | 5.98 | 2.95 |
|  | 1.34 | 8 wt % | 1.4 | 1.91 | 5.23 | 3.64 |
|  | 1.34 | 8 wt % | 1.4 | 1.99 | 4.67 | 4.17 |
|  | 1.34 | 8 wt % | 1.4 | 2.81 | 1.66 | 3.04 |
|  | 1.34 | 8 wt % | 1.4 | 3.06 | 1.28 | 3.82 |
|  | 1.34 | 8 wt % | 1.4 | 3.09 | 1.25 | 9.22 |
| Experimental Example 3 | 1.39 | 10 wt % | 1.5 | 1.34 | 3.4 | 3.38 |
|  | 1.39 | 10 wt % | 1.5 | 1.41 | 2.9 | 4.41 |
|  | 1.39 | 10 wt % | 1.5 | 1.5 | 2.42 | 4.31 |
|  | 1.39 | 10 wt % | 1.5 | 1.64 | 1.85 | 5.43 |
|  | 1.39 | 10 wt % | 1.5 | 1.98 | 1.05 | 6.75 |
|  | 1.39 | 10 wt % | 1.5 | 2.01 | 1.01 | 9.99 |
| Experimental Example 4 | 1.38 | 12.5 wt % | 1.5 | 1.75 | 2.72 | 4.77 |
|  | 1.38 | 12.5 wt % | 1.5 | 1.77 | 2.64 | 5.14 |
|  | 1.38 | 12.5 wt % | 1.5 | 1.8 | 2.5 | 5.22 |
|  | 1.38 | 12.5 wt % | 1.5 | 1.81 | 2.48 | 5.39 |
|  | 1.38 | 12.5 wt % | 1.5 | 1.85 | 2.31 | 13.21 |
| Comparative Example 1 | 2.2 | — | — | — | 2.2 | 2.6 |
| Comparative Example 2 | 2.6 | 30 wt % | 1.7 | — | 42.9 | 0.33 |
| Comparative Example 3 | 1.38 | 12.5 wt % | 1.5 | — | 14.7 | 0.57 |

In Table 1 for experimental example 1, the results showed that when a polyimide polymer with a high polydispersity index (PDI=2.6) is used as the spinning material, then a dry-jet wet spinning step can be used in combination with the expansion/thermal drawing step, so that a polyimide fiber with good fiber fineness and with fiber strength higher than 10 cN/dtex can be achieved. Similarly, as shown in experimental examples 2~4, when a polyimide polymer with a low polydispersity index (PDI=1.34~1.39) is used as the spinning material, a polyimide fiber with good fiber fineness and with solid fiber strength can also be achieved. Specifically, by varying the spinning solution concentration, expansion ratio and thermal drawing ratio, the formed fibers will have a fiber fineness and strength that can be controlled within a desirable range. For example, as shown in experimental example 2~4, the fiber strength will increase as the spinning solution concentration and thermal drawing ratio is increased, and the fiber fineness will decrease as the thermal expansion ratio is increased. Therefore, according to the above experimental example results, a person of ordinary skill in the art will be able to understand that the spinning solution concentration, the thermal expansion ratio and other related factors can be adjusted so as to achieve the desired fiber fineness and strength.

In comparison, when a melt spinning method (comparative example 1) is used to produce the fibers, the resulting fiber fineness and fiber strength quality is clearly non-comparable to the fibers synthesized by the dry-jet wet spinning step (experimental examples 1~4). Additionally, when the final thermal drawing step is not performed as shown in comparative example 2 and 3, even if the dry-jet wet spinning step is used to produce the fibers, the fiber fineness and strength of the formed polyimide fiber still cannot reach the desired expectations.

In summary, since the present embodiment uses the dry-jet wet spinning step with the temperature of the thermal drawing step controlled at 215° C.~350° C., therefore high fineness and high strength fibers can be produced when either high PDI or low PDI (that is PDI=1.3~2.6) polyimide polymer is used as the spinning material. In addition, the dry-jet wet spinning step of the present embodiment do not require the use of high toxic solvents, and since the polydispersity index of the polymer is high, therefore the temperature of the subsequent thermal drawing step can be controlled in a lower range. As such, the problems regarding solvent recovery and energy consumption during the high temperature manufacturing process can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A manufacturing method for a transparent fiber, comprising:
   providing a spinning solution, the spinning solution comprises a polyimide polymer and an organic solvent, wherein the polyimide polymer has a polydispersity index (PDI) of 1.3~2.6;
   performing a dry-jet wet spinning step on the spinning solution to form a plurality of fibers;
   performing a thermal drawing step on the plurality of fibers to form a plurality of transparent fibers, wherein the temperature of the thermal drawing step is from 215° C. to 350° C.

2. The manufacturing method for a transparent fiber according to claim 1, wherein the polyimide polymer in the spinning solution has a molecular weight range from 32,000 g/mol to 55,000 g/mol.

3. The manufacturing method for a transparent fiber according to claim 1, wherein the polyimide polymer in the spinning solution has a weight percentage from 8 wt % to 40 wt %.

4. The manufacturing method for a transparent fiber according to claim 1, wherein the thermal drawing step has a thermal drawing ratio from 1 to 5.

5. The manufacturing method for a transparent fiber according to claim 1, further comprising performing a hot roller expansion process before performing the thermal drawing step.

6. The manufacturing method for a transparent fiber according to claim 5, wherein the hot roller expansion process has an expansion ratio from 1 to 5.

7. The manufacturing method for a transparent fiber according to claim 5, wherein the dry-jet wet spinning step comprises:

loading the spinning solution into a spinning apparatus; and ejecting the spinning solution from the spinning apparatus, wherein the spinning solution comes into contact with air and enters a coagulation bath to form a plurality of transparent fibers.

8. The manufacturing method for a transparent fiber according to claim 1, wherein the preparation steps for the spinning solution comprises:

mixing a diamine monomer and an dianhydride monomer with an organic solvent and then performing a polycondensation reaction to form a polyamic acid polymer; and performing a cyclization reaction of the polyamic acid to form the polyimide polymer.

9. The manufacturing method for a transparent fiber according to claim 8, wherein the diamine monomer is selected from one of formula (1) to formula (4):

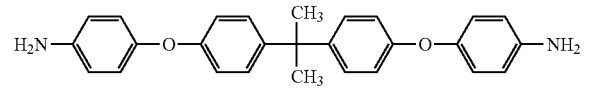
(formula 1)

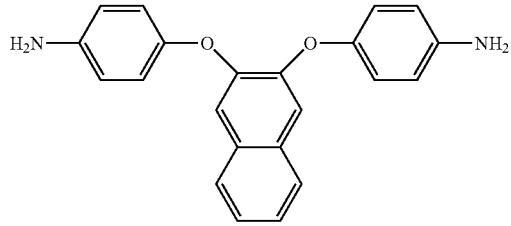
(formula 2)

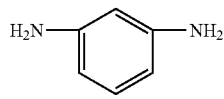
(formula 3)

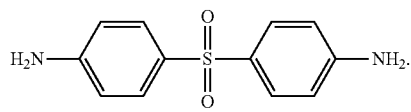
(formula 4)

10. The manufacturing method for a transparent fiber according to claim 8, wherein the dianhydride monomer is selected from one of formula (5) to formula (7):

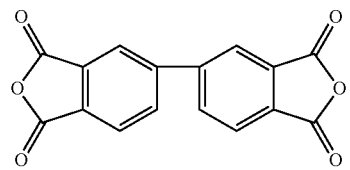
(formula 5)

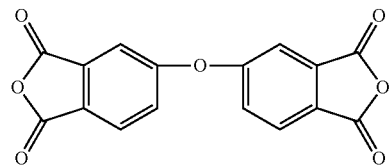
(formula 6)

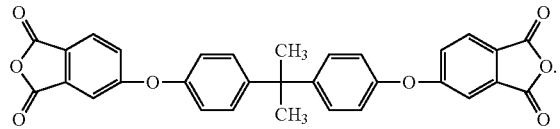
(formula 7)

* * * * *